April 29, 1941.  W. J. TRUMAN  2,240,272
REMOTE CONTROL MECHANISM FOR HAY RAKES
Filed Dec. 8, 1939

Inventor
William J. Truman,

By Clarence A. O'Brien
and Hyman Berman
Attorneys

Patented Apr. 29, 1941

2,240,272

UNITED STATES PATENT OFFICE 2,240,272

REMOTE CONTROL MECHANISM FOR HAY RAKES

William Jay Truman, White River, S. Dak.

Application December 8, 1939, Serial No. 308,242

2 Claims. (Cl. 56—27)

The present invention relates to hay rakes and has for its primary object to provide control means for the rake trip which is operable from the driver's seat of a tractor or other vehicle pulling the rake whereby to simultaneously release the foot lever provided for holding the rake down and also to trip the rake trip in the usual manner.

A further object is to provide a device of this character of simple and practical construction, which may be installed in operative position on the tongue of the rake without necessitating any material changes or alterations in the construction thereof and which is otherwise well adapted for the purposes for which the same is intended.

Figure 1:
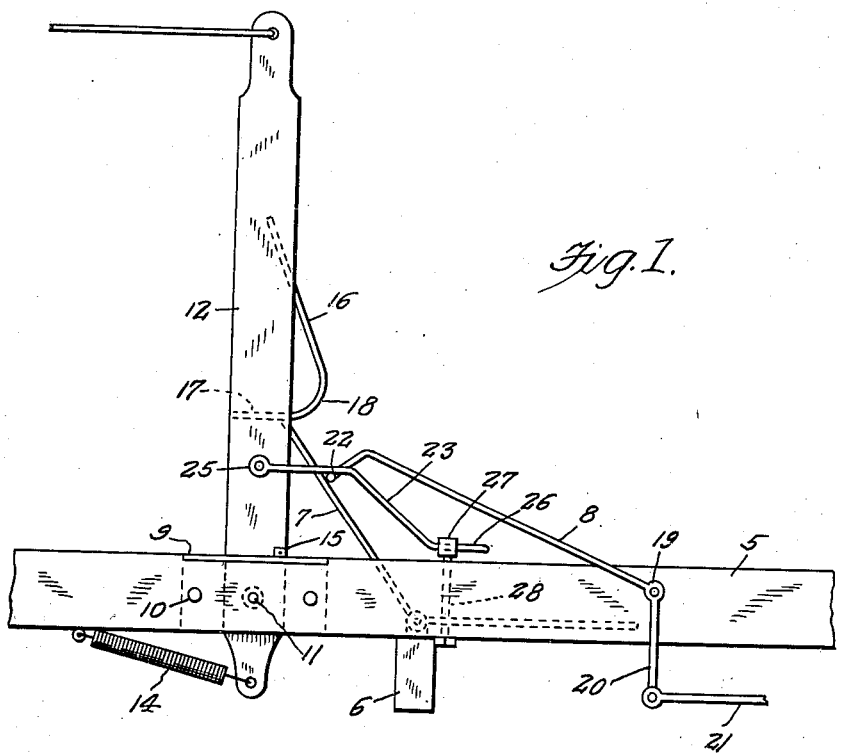
Figure 2:
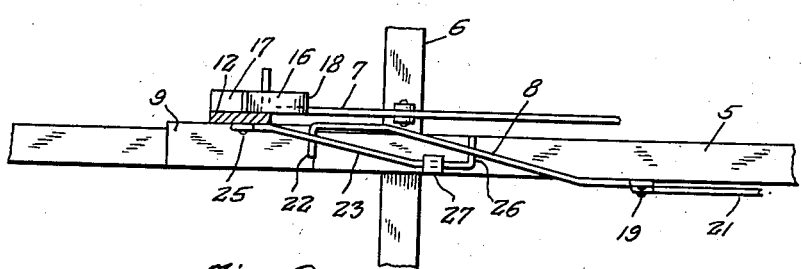

Other objects and advantages reside in the details of construction and operation as more fully hereinafter described and claimed, reference being had to the accompanying drawing forming part hereof, wherein like numerals refer to like parts throughout and in which:

Figure 1 is a side elevational view of the control mechanism shown mounted in position on the rake tongue and Figure 2 is a top plan view.

Referring now to the drawing in detail the numeral 5 designates the rake tongue and the numeral 6 designates the rake frame which extends transversely beneath the tongue. The usual foot lever for holding down the rake is shown at 7 and the rake trip is designated at 8. Secured to one side of the tongue is an angle bracket 9 which has one portion extending along one of the vertical side edges of the tongue and also including a top portion overlying the upper edge of the tongue, the bracket being secured to the tongue by means of bolts or the like 10.

Projecting outwardly from the side of the bracket is a pivot pin 11 on which is pivotally mounted the lower end of a lever 12 which extends upwardly from the tongue and is connected at its upper end with a control rod or cable 13 leading to the tractor employed for pulling the rake. The lower end of the lever projects below the tongue and is provided with a coil spring 14 yieldably maintaining the lever in a vertical position. A stop lug 15 is also attached to one side of the lever adapted to engage the upper edge of the bracket 9 to prevent rearward swinging movement of the upper end of the lever.

To one side of the lever 12 is secured a rod member 16 which includes a horizontal lower portion 17 adapted to overlie the free end of the foot lever 7 to hold the same down, the rod extending rearwardly and is curved upwardly and forwardly as shown at 18 to enable the same to ride into and out of position with respect to the free end of the foot lever.

The rake trip lever 8 is of substantially bell crank form as clearly shown in Fig. 1 of the drawing and is pivotally mounted intermediate its ends as shown at 19, the rear end of the lever extending downwardly as at 20 and is pivotally attached to a rod 21 leading to the rake trip (not shown). The other end of the lever 8 extends forwardly and upwardly and terminates in a transverse extension 22 which underlies the downwardly and rearwardly inclined intermediate portion 23 of a trip release rod 24 which is pivoted at its forward end as indicated at 25 to the lever 12. The rear end of the rod 24 extends horizontally above the tongue 5 as shown at 26 and is slidably mounted in a guide 27 carried at the upper end of a bolt 28 which extends through the tongue 5.

In the operation of the device upon the forward movement of the lever 12 the foot lever 7 is released from the rod 16 and at the same time the release rod 24 will be moved forwardly causing a downward movement of the front end of the trip 8 whereby to actuate the same.

It is believed the details of construction and manner of operation of the device will be readily understood from the foregoing without further detailed explanation.

What is claimed is:

1. A remote control mechanism for rakes comprising an upstanding lever pivotally mounted at its lower end, a forwardly extending operating member attached to the upper end of the lever, a stop limiting rearward movement of the lever, said rake including a foot lever adapted for holding the rake down and a rake trip member, said foot lever and rake trip member being pivotally mounted on the rake and extending in a forward direction, means carried by the first named lever normally holding the foot lever inactive and means also carried by said first named lever and engaging said trip member for actuating the latter.

2. A remote control mechanism for rakes provided with a foot lever adapted for holding the rake down, said mechanism comprising an upstanding lever pivotally mounted at its lower end, a forwardly extending operating member attached to the upper end of the lever, a stop limiting rearward movement of the lever, a pivoted rake trip member and a trip release rod for the rake trip member and a retaining rod for the foot lever, both of said rods being carried by the first named lever and said retaining rod releasing the foot lever and said trip release rod actuating the rake trip member upon a forward movement of said first named lever.

WILLIAM JAY TRUMAN.